Figure 1:
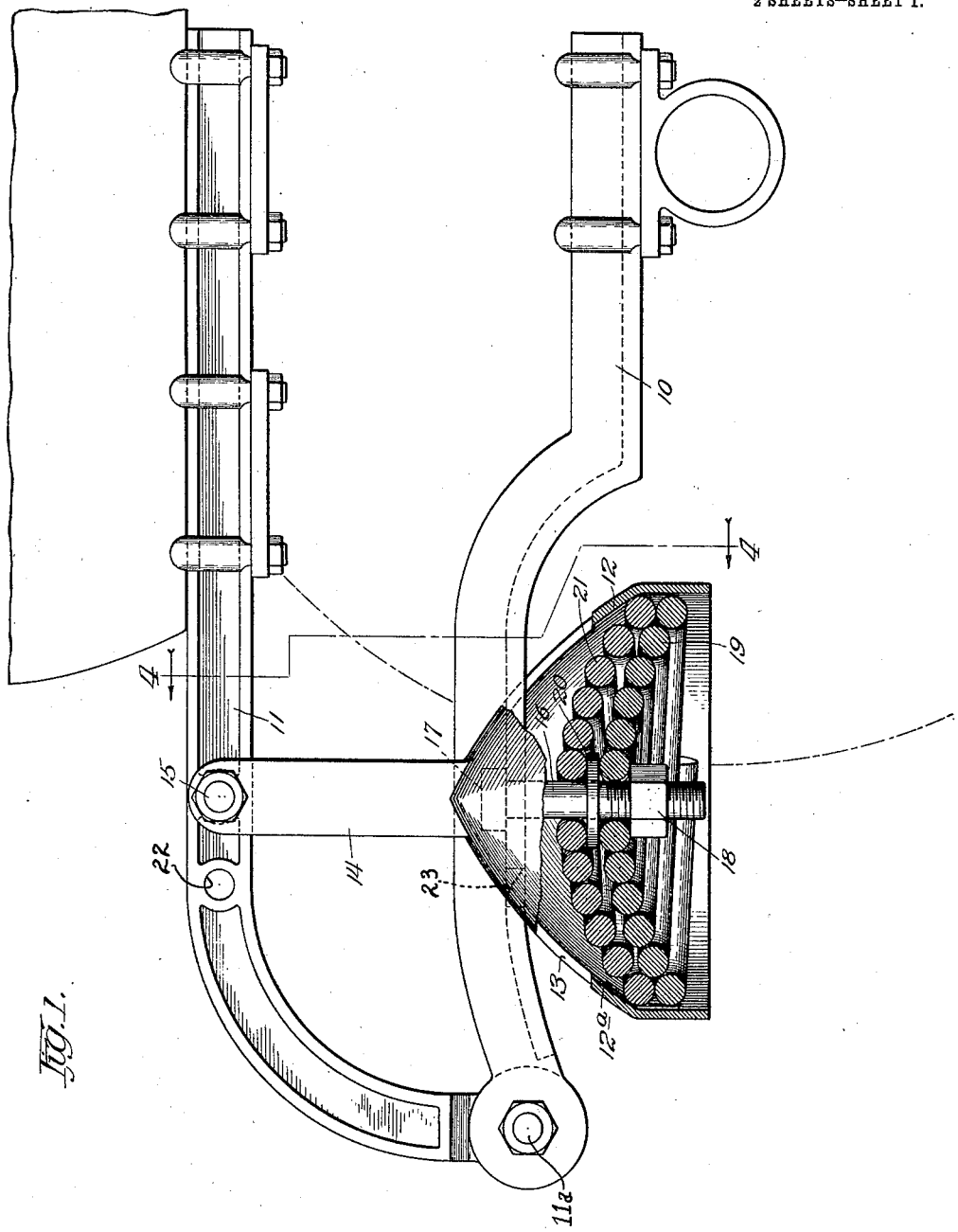

E. PROUTY.
SHOCK ABSORBER.
APPLICATION FILED JULY 14, 1911.

1,006,789.

Patented Oct. 24, 1911.

2 SHEETS—SHEET 1.

Witnesses
Robert N. Weir
Charles G. Cope

Inventor
Enoch Prouty
by Jones, Addington, Ames & Seibold
Attys.

E. PROUTY.
SHOCK ABSORBER.
APPLICATION FILED JULY 14, 1911.
1,006,789.
Patented Oct. 24, 1911.
2 SHEETS—SHEET 2.
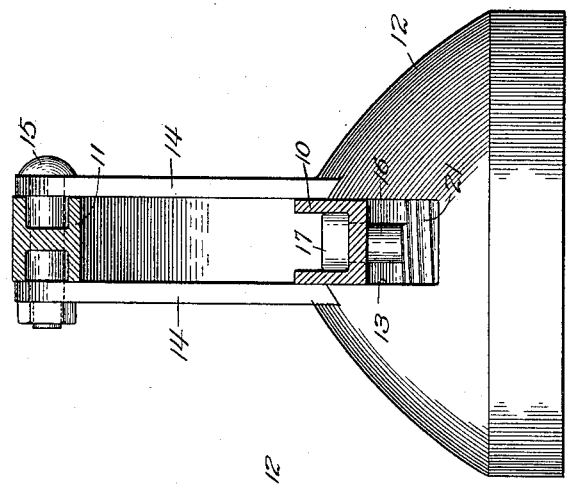
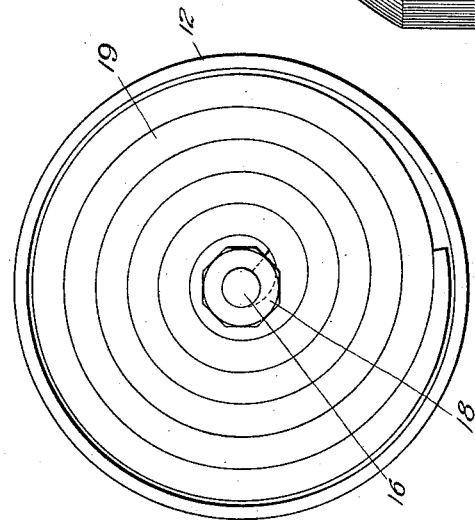
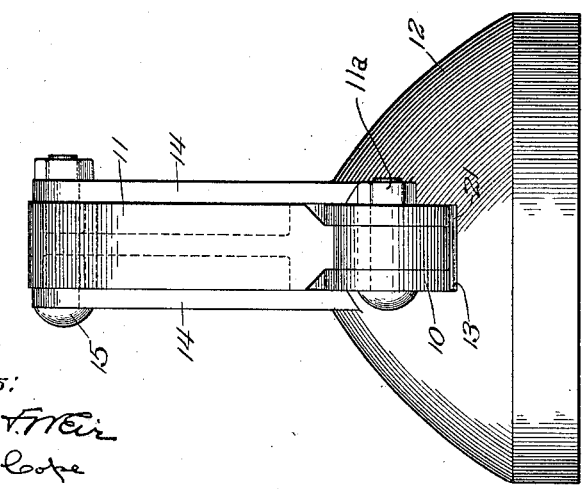

UNITED STATES PATENT OFFICE.

ENOCH PROUTY, OF JUNCTION CITY, KANSAS.

SHOCK-ABSORBER.

1,006,789.  Specification of Letters Patent. Patented Oct. 24, 1911.

Application filed July 14, 1911. Serial No. 638,497.

*To all whom it may concern:*

Be it known that I, ENOCH PROUTY, a citizen of the United States, residing at Junction City, in the county of Geary and State of Kansas, have invented new and useful Improvements in Shock-Absorbers, of which the following is a full, clear, concise, and exact description, reference being had to the accompanying drawing, forming a part of this specification.

My invention pertains to shock absorbers, and relates particularly to spring shock absorbers for use upon self-propelled vehicles. In devices of this character, it is desirable that the wheels of the vehicle shall have considerable freedom of movement, that is, a long travel relatively to the body; otherwise the shock resulting from the encountering of an obstacle by the wheels, will not be taken up to an extent sufficient to avoid unpleasant jarring. On the other hand, the use of springs arranged so that they have a comparatively long travel is subject to the disadvantage that too much motion is imparted to the body, and the springs wear out more quickly than otherwise would be the case.

It is the principal object of my invention to produce a shock absorber of high efficiency, which, apart from absorbing the jars, will communicate as little movement as possible to the body of the vehicle; that is to say, it is my chief object to produce a shock absorber which allows of a long travel of the wheels relatively to the body, but the travel of the resilient portion of which is comparatively short.

It is a further object of my invention to provide a shock absorber of this kind which will be of a simple and durable construction.

With the above objects in view, I have constructed a shock absorber embodying my invention, and, having found the same to be satisfactory, have chosen it as conveniently illustrating my invention. In order that the invention may be clearly understood, this embodiment is described in the following specification and shown in the accompanying drawings. It is to be understood, however, that my invention may be embodied in other constructions which lie within the scope of the appended claim.

In the drawings: Figure 1 is a side elevation of the shock absorber with a part of the spring casing broken away, and with the springs shown in section; Fig. 2 is an end elevation of the device; Fig. 3 is an inverted plan of the spring casing and the springs contained therein; and Fig. 4 is a vertical section on the line 4—4 of Fig. 1 looking in the direction of the arrows.

The shock absorber shown in the drawings consists of an arm and a leader iron mounted so as to extend outward in a longitudinal direction from the axle and the body respectively, and pivotally connected to each other at their outer ends. A cushioning device of the general type described and claimed in my Letters Patent No. 971,636, October 4th, 1910, is mounted between the arm and the leader iron toward the outer ends thereof; so that the movements of the cushioning device are of considerably less amplitude than those of the axle. In applying the device to the ordinary four wheeled automobile, four of the devices are employed,—two at each end of the machine. The devices being all similar, however, it is only necessary to describe one of them.

Referring now to the drawings; 10 indicates the arm, which is adapted to be secured to an axle of the vehicle so as to extend outwardly from the same in a longitudinal direction. The outer end of the arm 10 is forked so as to receive the end of the leader iron 11, which extends outwardly from the body of the car in a longitudinal direction, a bolt 11ª being provided for pivotally connecting the end of the leader iron 11 to the arm 10.

A cushioning device is mounted between the leader iron 11 and the arm 10 at such a distance from the axle that considerably less movement is imparted to the parts of the cushioning device than that through which the axle moves in riding over an obstacle. In other words the bolt 11ª forms the fulcrum of a lever, the power being transmitted from the axle at one end of the arm 10 to the cushioning device located between the axle and the fulcrum. In the drawings I have shown the device so arranged that the leverage may be either three to one or four to one; but I may construct the device for any leverage which may be required. The cushioning device includes a hollow spring casing 12 which is located beneath the outer end of the arm 10, and has a slot 13 therein for receiving the same. Extending upwardly from the casing 12, one on either side of the arm 10, is a pair of rods 14, the ends of which embrace the leader iron 11 and are secured thereto by a bolt 15. Immediately beneath the hole in the leader iron 11 through which the bolt 15 passes, the arm 10 is formed with a hole through which extends a threaded member 16 provided with a head 17 at its upper end which rests upon the arm 10. The threaded member 16 is provided at its lower end with a nut 18 which engages against the lower part of a horizontally disposed volute spring 19. Above the spring 19 is placed a washer 20 which engages beneath the lower face of a horizontally disposed volute spring 21 similar to the spring 19. The springs 19 and 21 are arranged so that as they are distorted to an increasing extent, the coils of the spring 21 will seat to a greater extent against the inner surface of the casing 12, which surface is substantially conical; whereby the resistance of the springs to distortion becomes greater as the distorting force increases. The nut 18 is adjusted upon the member 16 so as to give the correct distance between the axle and the body; and the thickness of the washer 20 is such that in the case of a particularly heavy shock, the whole of the spring 21 will seat before the inner end of the arm 10 can strike the inner end of the leader iron.

In the device shown, the distance between the bolt 11$^a$ and the member 17 is approximately one third of the distance between the bolt 11$^a$ and the axle, the effect being that a movement of the axle through a certain distance will only cause a distortion of the spring through about one third of that distance. Thus the axle is allowed considerable freedom, while the spring is not required to have a long travel,—the result being that a very efficient shock absorbing device is produced and one which does not permit any very great swaying movement to be imparted to the car by the shocks at the axles.

In order to provide for an increased leverage, if desired, I form the leader iron 11 with a hole 22, and the arm 10 with a hole 23 arranged so as to give a leverage of four to one instead of three to one.

I have described an embodiment of my invention, but wish it to be understood that the invention may be embodied in other constructions than that described; and that changes may be made in the device described and shown without exceeding the scope of the appended claim.

Having thus described my invention, what I claim as new and desire to secure by Letters Patent, is:

A shock absorber for vehicles comprising a member connected to an axle so as to extend outward therefrom in a longitudinal direction, a member connected to the body so as to extend outward therefrom in a longitudinal direction, said members being pivoted together at their outer ends, a spring casing connected to one of said members adjacent the pivot, said spring casing having a conical inner surface, a volute spring mounted in said casing, so as to engage at its periphery the inner surface of said casing, and a device extending from the other of said members for engaging said spring centrally, for the purposes set forth.

In witness whereof, I have hereunto subscribed my name in the presence of two witnesses.

ENOCH PROUTY.

Witnesses:
 THOS. B. KENNEDY,
 A. H. MOON.

---

Copies of this patent may be obtained for five cents each, by addressing the "Commissioner of Patents, Washington, D. C."